United States Patent

[11] 3,614,626

| [72] | Inventor | George M. Dillard<br>San Diego, Calif. |
|---|---|---|
| [21] | Appl. No. | 522,986 |
| [22] | Filed | Jan. 25, 1966 |
| [45] | Patented | Oct. 19, 1971 |
| [73] | Assignee | The United States of America as represented by the Secretary of the Navy |

[54] RADAR DETECTOR SYSTEM
6 Claims, 2 Drawing Figs.

[52] U.S. Cl. ..................................... 325/323,
343/5 DP, 325/476
[51] Int. Cl. ....................................... H04b 1/10
[50] Field of Search............................ 325/476,
323; 343/5 DP, 17.1, 18 E

[56] References Cited
UNITED STATES PATENTS

| 2,446,244 | 8/1948 | Richmond ............ | 343/13 |
|---|---|---|---|
| 2,970,304 | 1/1961 | Lakatos ............... | 340/248 |
| 3,094,665 | 6/1963 | Wildman ............. | 325/475 |
| 3,145,379 | 8/1964 | Caspers ............... | 343/5 |

*Primary Examiner*—Malcolm F. Hubler
*Attorneys*—Louis A. Miller, Paul N. Critchlow and John W. McLaren ABSTRACT: A system is disclosed for improved detection of signals in the presence of noise and interference. It employs a distribution-free criteria to indicate either the presence or absence of signal. A source of known noise data is connected to means for converting the known noise data to digital form. A separate means for converting signal analog input data similarly converts this data to digital form. An appropriate means is provided for successively comparing the digital quantity of each increment of determinable sequence of the input data with the digital quantity of each increment of a like sequence of the known noise data. This latter means is responsive to the quantitative difference detected for each incremental comparison for producing a signal which is commensurate with the determined difference. The difference signals thus produced for each compared sequence are summed and the sum of the difference signals are compared with a signal of predetermined quantitative significance which produces an output indicative of the presence of signal in the analog input data when the summed difference signals exceed the signal of predetermined quantitative significance and produces an output indicative of the absence of signal in the analog input data when the signal of predetermined quantitative significance exceeds the summed difference signals.

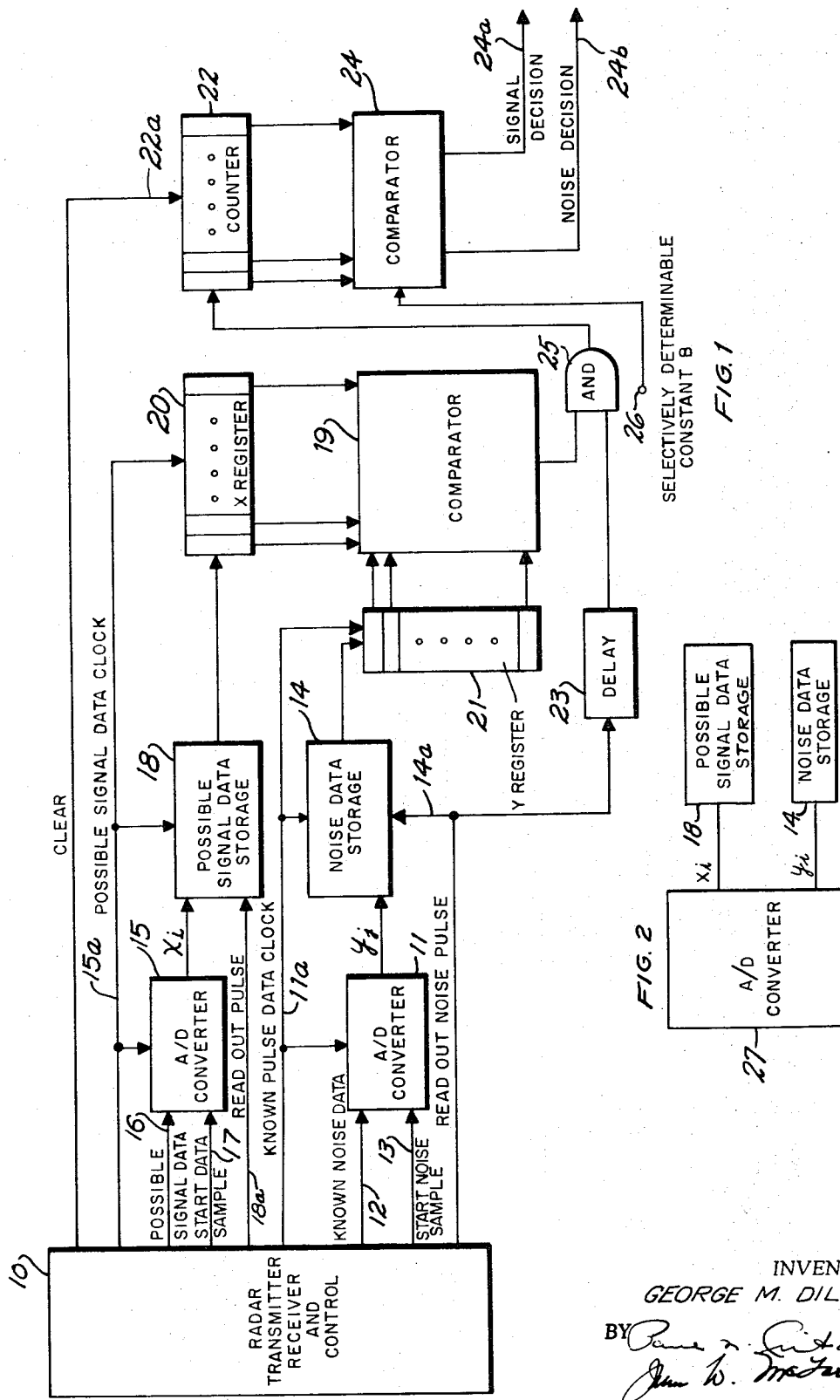

RADAR DETECTOR SYSTEM

The present invention is concerned with a system for detecting signals in the presence of noise and more particularly such a system which is particularly advantageous for use with a search radar operating in an environment in which it is expected that countermeasures may be employed.

When countermeasures are employed, it is desirable to have built-in counter-countermeasure capability in such a radar and that capability enables the radar to operate effectively even in the presence of jamming or other intentional interference techniques.

While it is desirable to have counter-countermeasure capability, such capability preferably should not seriously degrade or impair the performance of the radar system in the absence of countermeasures. For certain types of countermeasure techniques one possible method of providing a counter-countermeasure capability is to employ "distribution free" statistics.

Most conventional radar detecting systems, and especially those which operate automatically, contain some type of "thresholding" arrangement wherein a decision is made as to the presence of signal in the reflected and received radar signals together with interference and noise. Such a "threshold" criteria may simply be that the receiver output voltage, for example, exceeds a certain quantization level. A quantization level of this type sometimes is determined by statistical methods under the assumption that the statistical properties of the radar return signals are known or determinable both when a signal is present and when only noise or interference is present. This procedure can be shown to be a good one in the absence of intentional interference in the form of countermeasures but those skilled in the art will appreciate that any intentional countermeasures which would drastically change the statistical properties of the noise would render the procedure ineffective and the threshold criteria invalid.

Accordingly, it is an object of the present invention to provide a system for detecting signals in the presence of noise and interference which employs a distribution free criteria to indicate the presence or absence of signal.

Another object of the present invention is to provide such a system which is readily adaptable to the employment of digital and quantizing techniques.

Yet another object of the present invention is to provide such a system wherein the detection of signal in the presence of noise or interference may be accomplished in accordance with a selected maximum acceptable false alarm rate.

A further object of the present invention is to provide such a system for detecting signals in the presence of noise or interference which is particularly adaptable to time-sharing analog-to-digital converter portions of the system.

In its preferred form the system of the present invention may provide a source of sequential analog input data such as is realized at the receiver of a radar, for example, and a source of known noise data which may be developed by directing the radar at a given region in space where it is known that no reflective targets are present. The sequential analog data and the known noise data are each converted to digital form and means are provided for successively comparing the digital quantity of each increment of a determinable sequence of the input data with the digital quantity of each increment of a like sequence of known noise data. This latter means is responsive to the quantative difference of such comparison for producing a signal commensurate with the amplitude of such difference. A summing portion of the system is connected to receive the difference signals and additively sum each compared sequence. The summed difference signals are then compared with a signal of predetermined quantative significance which is operative to produce output indicative of the presence of signal in the analog data when the summed difference signals exceed the predetermined quantative signal. Conversely, the comparison means is operative to produce an output indicative of the absence of signal in the analog input data when the selected signal of predetermined quantative significance exceeds the summed difference signals.

The system of the present invention is particularly advantageous inasmuch as the requirement for converting the input data to digital form may be accomplished for both the analog input data and the known noise data by a time-shared analog-to-digital converter means.

These and other objects, advantages and features of the present invention will be more fully understood from the description of an embodiment which follows when taken together with the illustrative drawings and the scope of the invention will be pointed out in the appended claims.

IN THE DRAWINGS:

FIG. 1 is a schematic block diagram of a system embodying the present invention;

FIG. 2 is a schematic block diagram illustrating a time-shared analog-to-digital converter operative in the system of FIG. 1.

Many types of systems are known in the prior art for establishing a criteria for a "thresholding" type of device wherein a signal may be said to be present in a background of interference or noise if it exceeds a certain quantized level of amplitude and where a decision is made that no signal is present if it does not exceed the quantized level. Many of such systems may assume that the statistical properties of the radar return signal are known or determinable when a signal is present or when only noise is present. Such an assumption may be valid in the absence of intentional countermeasure techniques but any countermeasure interference which would drastically change the statistical properties relied upon, would likely render the procedure ineffective and the assumption invalid.

By employing distribution-free statistics some countermeasures can be effectively countered. One distribution-free test which may be advantageously employed is the Mann-Whitney-Willcoxon test. This test compares the data from a source known to contain only noise with separate data from a source which may possibly contain both useful signal as well as noise. If the known noise data is found by such comparison to be stochastically smaller than the other input data which possibly contains useful signal, then a decision is made that a signal is present. If the employment of a countermeasure technique changes the background noise by such means as barrage jamming, then the signal plus noise is changed proportionately and the test is still effective in determining if a signal is present.

The Mann-Whitney-Willcoxon test may be applied to radar detection in the following manners, assuming that data are available from a known noise source by taking data, for example, from a given region in space where it is known that no targets are present it may be validly supposed further that the characteristics of the noise will not change rapidly with time. Considering a particular azimuth or elevation sector of space, let $X_{ij}$ be the data received from the $i^{th}$ resolution element after the $j^{th}$ pulse transmission in that particular sector of space. Suppose, further, that a total of N pulses is transmitted in each sector; then $X_i = (X_{i1}, X_{i2}, ... X_{iN})$ is the data sample from the $i^{th}$ resolution element. For each resolution element, $X_i$ is compared with a noise sample which may be expressed as $Y = (y_1, y_2, ... y_M)$ and a decision is to be made as to whether Y and $X_i$ were obtained from the same population. It should be noted that usually M is larger than or equal to N. If it is decided that Y and $X_i$ were obtained from the same population, a decision is made that only noise is present; otherwise a decision is made that a signal of significance is present in the $i^{th}$ resolution element.

The type of comparison mentioned above can be accomplished as follows: the samples Y and X (eliminating the subscript $i$ on the X's for purposes of simplicity and clarity) are combined with elements retaining identity and arranged in order of increasing magnitude. An example where an $N=M=5$ may be expressed as $(X_5, Y_2, X_1, Y_4, Y_1, Y_3, X_2, Y_5, X_3, X_4)$. This order of increasing magnitude is then examined to determine the number of Y's preceeding each of the X's. In the example given above there are no Y's to the left of $X_5$ there is one Y to the left of $X_1$; there are four Y's to the left of $X_2$; five Y's to the left of $X_3$; five Y's to the left of $X_4$ indicating that all the Y's to the left of each of the X's are of greater amplitude since the entire series is arranged in order of magnitude.

The sum of the Y's which precede each of the X's may be denoted by U. The sum U is then calculated and compared with a predetermined constant quantity B. If U is greater than B, a decision is made that the Y's are stochastically smaller than the X's, indicative of a decision that a signal is present in the received data. If B is equal to or smaller than U, a decision is made that only noise is present in the received data. In the example above, U happens to be equal to 15. Those skillful in the art will appreciate that the constant B may be chosen so that the system will operate with a determinable and desirable false alarm probability.

FIG. 1 illustrates an embodiment of the present invention operating on the principles and concept described hereinbefore. A radar transmitter, receiver and control is shown at 10. The radar is so arranged as to receive signals having possible target significance as well as signals which are known to contain only noise. An analog-to-digital converter 11 receives known-noise data through the connection 12 from the radar 10 and also a start-noise-sample pulse through the connection 13 from radar 10. The known-noise data are converted to B bit binary numbers, which may be represented as $Y_j$, upon reception of the start-noise-sample pulse. These data consist of M observations $Y_1, Y_2,..., Y_m$ which are stored in a noise data storage means 14. Possible target signal information data are received in a second analog-to-digital converter 15 by a connection 16 from the radar 10 and such possible signal data are converted to B bit binary numbers $X_i$ by the analog-to-digital converter 15 upon reception of a start-data-sample pulse through the connection 17 from the radar 10. These latter data consist of N observations $X_1, X_2,...., X_N$ which are stored in the possible signal data storage 18. A comparator 19 compares the contents $X_i$ of an X register 20 with the stored contents $Y_j$ of a Y register 21. If $X_i$ is greater than $Y_j$ a "one" is caused to be transmitted to a counter 22. If, however, the comparison of the signal content of the X register with the signal register of the Y register shows that $Y_j$ is equal to or smaller than $X_i$, a "zero" is transmitted to the counter 22.

Appropriate possible signal data clock pulses are transmitted from the radar 10 over the connection 15a to the analog-to-digital converter 15, the possible signal data storage 18, and the X register 20. Similarly, noise data clock pulses are transmitted from the radar 10 over the connection 11a to the analog-to-digital converter 11, the noise data storage 14, and the Y register 21.

The cycle of operation of the detector system of the present invention includes the following preferred sequence. A "clear" pulse from the radar 10 is transmitted to the counter 22 as shown by the connection 22a and causes the counter 22 to be cleared. Then a start noise sample pulse transmitted from the radar 10 to the analog-to-digital converter 11 over the connection 13 causes the M observations $Y_1, Y_2,..., Y_M$ to be converted to binary numbers and stored in the noise data storage 14. The noise data storage 14 can be any compatible storage device such as an M bit shift register, a magnetic drum or a magnetic core storage. A start-data-sample pulse transmitted from the radar 10 to the analog-to-digital converter 15 over the connection 17 causes the N observations of possible signal data $X_1, X_2,..., X_N$ to be stored in an associated data storage 18. When all the possible signal data received in the storage means 18 are stored therein, a readout data pulse transmitted from the radar 10 over the connection 18a to the storage means 18 causes $X_1$ to be read into the X register 20.

A readout noise pulse is transmitted from the radar 10 to the noise data storage means 14 over the connection 14a and causes $Y_1$ to be nondestructively read out of the noise data storage means 14 and into the Y register 21. The possible signal data clock pulse transmitted over connection 15a to X register 20 causes $X_1$ to be read out as one input to the comparator 19. The known noise data clock pulse transmitted over connection 11a to Y register 21 causes $Y_1$ to be read out as the second input to comparator 19. If $X_1$ is greater than $Y_1$, comparator 19 produces a "one" output which is connected as an input to an AND-gate 25; if $X_1$ is equal to or less than $Y_1$, comparator 19 produces a "zero" output which is impressed as an input upon AND-gate 25. The readout noise pulse is delayed in an appropriate delay means 23 and provides a second input to AND-gate 25 which enables AND-gate 25 producing a "one" to be added to the counter 22 if $X_1$ is greater than $Y_1$; if $X_1$ is equal to or less than $Y_1$; a "zero" is transmitted to the counter 22. With the $X_1$ data still in the X register 20, a sequence of readout noise pulses follows causing sequential comparison of $X_1$ with $Y_j$, $j=2,3,...,M$ and causing a "one" to be added to the counter 22 for each occurrence wherein $X_1$ is greater than $Y_j$. When $X_1$ has been compared with each discrete data element $Y_1, Y_2 ... Y_M$, a readout data pulse causes the observation $X_2$ to be shifted into the X register 20 and to be compared sequentially with each of the elements of Y data $Y_1, Y_2...Y_M$. This procedure is repeated for $X_3, X_4$ and on through to the last sequential element of X data, $X_N$, at which time the contents of the counter 22 is transmitted to a comparator 24; the contents of the counter 22 are compared with a selectively determinable constant B received at input terminal 29 and the comparator 24 will produce a decision that either information signal is present in the initially received possible signal data or it is not present. If the contents of counter 22 is greater than the chosen number or constant B, a decision is made that a signal is present and an appropriate output transmitted over the connection 24a. If the output of the counter 22 is less than the chosen number or constant B, a decision is made that only noise is present and no significant information signal was present in the possible signal data initially received for evaluation. The same procedure is duplicated for each resolution element of new data which is under consideration and is similarly repeated for each sector.

Those skilled in the art will appreciate that the concept of the present invention lends itself to a possible simplification by reason of time-sharing the analog-to-digital conversion means so that only a single such means is required rather than the two analog-to-digital converters 11 and 15 as indicated in the schematic block diagram of FIG. 1. FIG. 2 illustrates a time-shared analog-to-digital converter 27 connected in place of the two converters 11 and 15 shown in FIG. 1. The analog-to-digital converter 27 is time-shared and adapted to provide $XX_i$ outputs to a possible signal data storage element 18 as well as $Y_i$ outputs to a noise data storage element 14. The resolution elements in each particular sector of interest may be range bins, for example, (that is, data taken from some specific ranges or distances in space) and the noise data taken either from the innermost ranges where one could observe the absence of targets or from the outermost ranges where a target, if present, would change the signal noise level only insignificantly. With this arrangement, the known noise data and the possible signal data could be obtained serially and therefore only one analog-to-digital converter 27 is necessary since it could be readily employed in the concept and teaching of the present invention by merely arranging for appropriate switching of the analog-to-digital converter 27 output between the possible signal data storage means 18 and the noise data storage means 14.

It will be appreciated by those knowledgeable in the art that the present invention provides a significantly improved method, means and criteria for reaching a decision as to whether or not significant informational signal content is present in possible signal data. The unique and highly desirable application of the Mann-Whitney-Willcoxon distribution-free tests affords a means of obviating many of the deficiencies of the prior art when employed in the face of countermeasures, jamming, and intentional interference.

The present invention and the embodiment shown in the drawing has been explained in terms of an embodiment employing a binary code. It will be evident to those skilled in the art that other appropriate means as may be desirable may be employed within the spirit and teaching of the present invention as required for particular applications of the inventive concept.

Obviously many modifications and variations of the present invention are possible in the light of the above teachings. It is therefore to be understood that within the scope of the appended claims the invention may be practiced otherwise than as specifically described.

What I claim is:

1. A system for detecting signals in the presence of noise comprising:
    a source of sequential analog input data;
    a source of known noise data;
    means for separately converting said sequential analog input data and said known noise data to digital form;
    means for successively comparing the digital quantity of each increment of a determinable sequence of said input data with the digital quantity of each increment of a like sequence of known noise data,
    said means being responsive to the quantitative difference of each such incremental comparison for producing a signal commensurate with said difference;
    means connected to receive and sum the difference signals of each compared sequence; and
    means for comparing the said sum of said difference signals with a signal of predetermined quantitative significance, said means being operative to produce an output indicative of the presence of signal in said analog input data when said summed difference signals exceed said signal of predetermined quantitative significance, and to produce an output indicative of the absence of signal in said analog input data when said signal of predetermined quantitative significance exceeds said summed difference signals.

2. A system for detecting signals as claimed in claim 1 wherein said means for separately converting said sequential analog input data and said known noise data to digital form comprises a time-shared analog-to-digital converter.

3. A system for detecting signals as claimed in claim 1 wherein said means for successively comparing the digital quantity of each increment of a determinable sequence of said input data with the digital quantity of each increment of a like sequence of known noise data is responsive to the excess difference of said digital data input relative to each digital noise data increment for producing a digital signal commensurate therewith.

4. A system for detecting signals as claimed in claim 1 including means for selecting said signal of predetermined quantitative significance in accordance with a maximum acceptable false alarm rate of said indications of the presence of signals in said analog input data.

5. A system for detecting signals as claimed in claim 1 wherein said means for comparing said summed difference signals further includes means for producing an output indicative of the presence of signal in analog input data when the known noise data is stochastically smaller than said input data.

6. A system for detecting signals as claimed in claim 5 wherein said means for comparing the sum of said difference signals further includes means for producing an output indicative of the presence of signal in analog input data when the known data is stochastically smaller than said input data by a margin selected in accordance with a determinable probability of error.